Nov. 1, 1932.  J. KAHL  1,885,206
PASSENGER CAR FOR AMUSEMENT PARKS
Filed July 6, 1931   2 Sheets-Sheet 1

Inventor:
John Kahl.
By [signature]
Attorneys.

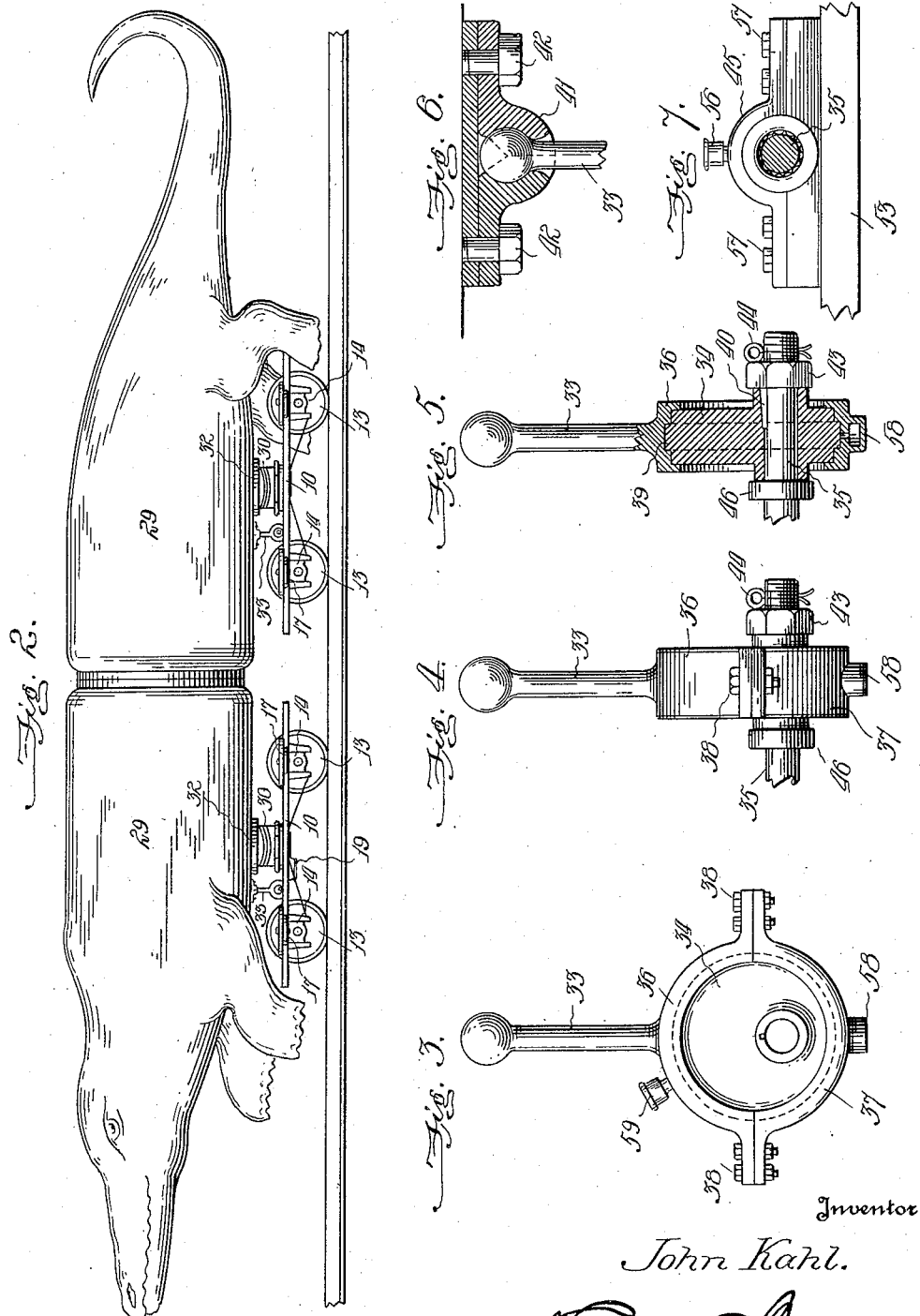

Patented Nov. 1, 1932

1,885,206

UNITED STATES PATENT OFFICE

JOHN KAHL, OF KANSAS CITY, MISSOURI

PASSENGER CAR FOR AMUSEMENT PARKS

Application filed July 6, 1931. Serial No. 549,029.

My invention is an improvement in amusement apparatus and relates more especially to the provision of a car or carriage the motion of which as it travels over the rails will add to the enjoyment of the passengers.

In the present instance my invention is intended to provide special means for imparting sidewise rocking motion to the different sections of a train of cars connected together in the manner illustrated in my prior Patent No. 1,789,140, dated January 13, 1931; that is to say, the sectional car may be designed to represent an animal, for example an alligator, and the rocking of the sections from side to side in opposite directions will imitate the crawling or walking motions of the animal while the passengers within the car will experience sensations similar to those in a rocking boat.

My invention therefore contemplates the provision of a truck for each section of the car so constructed and operable in connection with the body of the car as to impart the desired rocking motions to the connected car sections, the operating means including a yieldable support for the car body and interposed connections at opposite sides of the center of the truck for imparting the rocking motion, said means consisting preferably of reciprocating rods each operated by an eccentric keyed to a shaft driven by a motor mounted on the truck and employed also in operating the car over the tracks; all as hereinafter fully described and specifically set forth in the appended claims.

In the drawings:—

Fig. 2 is a side view showing the application of the truck in supporting a car body.

Fig. 3 is a detail view of one of the devices for rocking the car body.

Figs. 4 and 5 are side and sectional views of said device.

Fig. 6 is a detail view of the connection between the reciprocating rod and car body, and Fig. 7 is a view of one of the ball bearings for the operating shaft.

Figure 1:
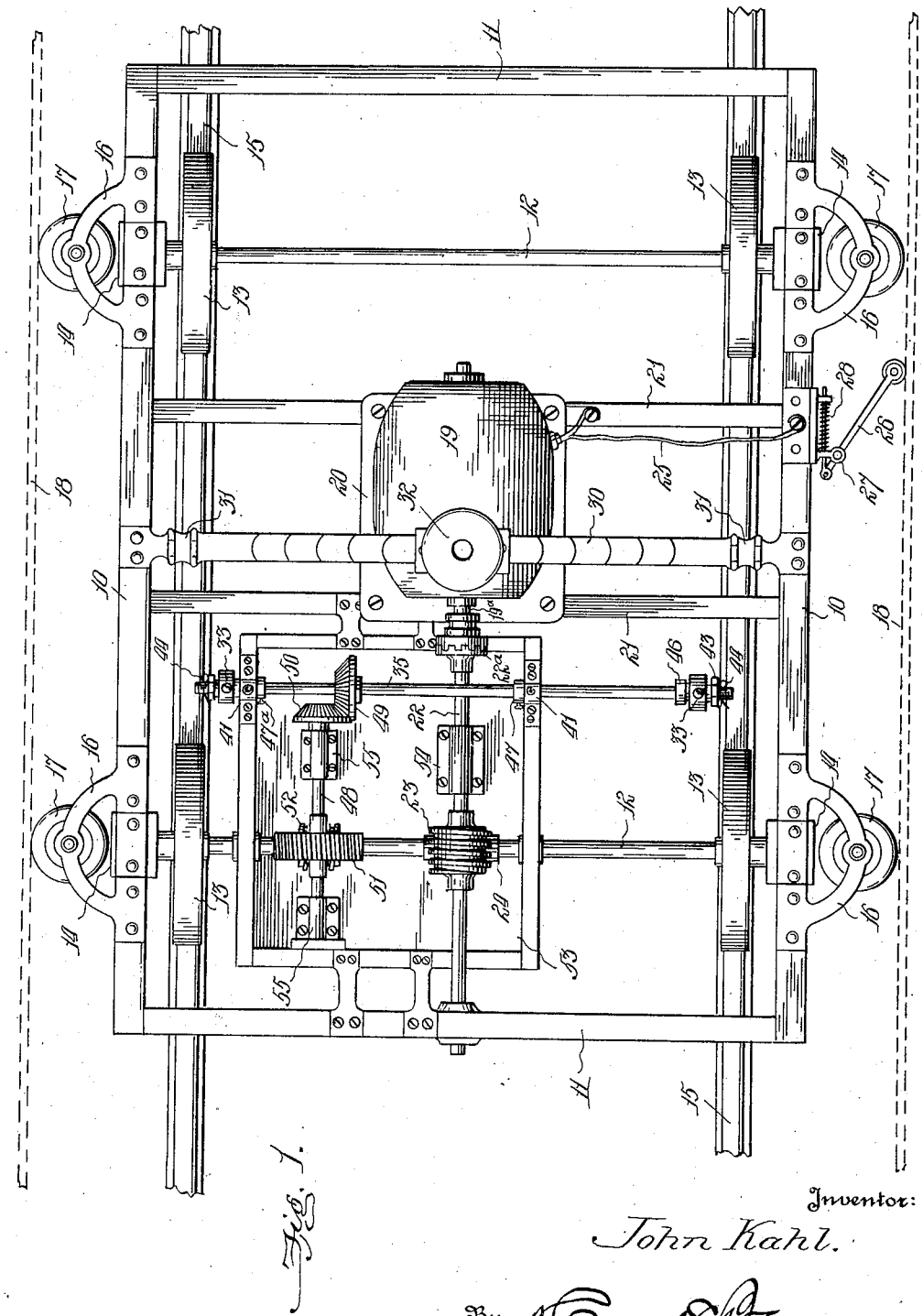
Figure 1 is a plan view of an amusement car truck constructed in accordance with my invention.

In carrying out my invention I employ a truck on which the body of the car is mounted, said truck consisting of a rectangular frame having longitudinal side pieces 10, 10 and cross pieces 11, 11 at the ends thereof, with the axles 12, 12 for the car wheels 13 journaled in bearing boxes 14 at the under side of the longitudinal side pieces of the frame, and in order that the truck may be guided on the track rails 15, or prevented from leaving the same, brackets 16 are bolted on the side pieces 10 to carry the rubber-tire guide wheels 17 adapted to bear against guard rails 18 at opposite sides of the track or runway for the amusement car. For operating the car one of the axles is driven by an electric motor 19 on the platform 20 supported by cross-pieces 21, 21 of the truck frame, the motor shaft 19a being connected by clutch 22a to driving shaft 22 geared to the axle by intermeshing worm-wheels 23 and 24, and the electric motor is supplied with current through conducting wires 25 and trolley 26, the latter being supported in a frame 27 at one side of the truck and is of a conventional type in which the trolley arm is actuated in one direction by spring 28.

For supporting each car body or section 29 of the amusement car on its truck to relieve the reciprocating rod or rocking means, hereinafter described, from the full weight of the body, a leaf spring 30 extends transversely across the center of the frame and is connected to the longitudinal side pieces thereof by hinges 31, said leaf spring being provided centrally with an apertured plate 32 through which a king bolt (not shown) extends from the bottom of the car, it being noted by reference to Fig. 2 of the drawings that the body of the amusement car is in two sections each mounted on a separate truck and are connected together for turning movement one upon the other, as set forth in my prior patent hereinbefore referred to, whereby each section of the car body may have an independent rocking movement imparted thereto by the operating means which in the present instance consists of a reciprocating rod 33 operated by a shaft geared to the driven axle.

The operating means for rocking the car body or a section thereof is duplicated at opposite sides of the center of the truck and consequently a description of one will apply to the other, like numerals of reference being employed. The reciprocating rod 33 may be and preferably is operated by an eccentric 34 keyed to a driven shaft 35, the reciprocating rod or rocker arm being connected to the eccentric by a two-part flanged ring to the section 36 of which the rod or arm is integrally connected and said section connected to the section 37 by bolts 38 passing through companion projections at opposite sides of the ring. As shown in Fig. 5 the eccentric is provided peripherally with a ridge 39 seated in a corresponding groove in the ring, and the side flanges of the latter overlap the opposite sides of said eccentric which is fixed to the shaft by key 40. The outer end of the reciprocating rod or arm is connected to the under side of the car body by a bearing-box 41 attached to the under side of the car by bolts 42, said bearing-box being in two parts between which the rounded outer end of the reciprocating rod or arm is fitted for slight turning movement therein. The eccentric is held on the end of the shaft by means of a nut 43 threaded on said shaft against the outer end of the hub on said eccentric, the nut being locked in place by a cotter-pin 44, and in one instance the eccentric bears against the shaft-bearing 45, while in the other it bears against a collar 46 on the shaft 35, and longitudinal movement of the shaft in its bearings 45, 45 is prevented by collars 47, 47 at the inner side of said bearings respectively secured thereto by set screws 47a. The shaft 35 on which the eccentric is mounted is driven from the motor-driven axle by an intermediate shaft 48 to which it is connected for operation by bevel gearwheels 49, 50, the said intermediate shaft being geared to the axle by intermeshing worm-wheels 51, 52, and for lubricating the gears they are located within a pan or casing 53 supported in the truck as shown and having bearings 54 and 55 rising from the bottom thereof and in which the shafts are journaled. The shaft bearings 45 are in the form of ball-bearings as shown in Fig. 7 with an oil cup 56 in the upper plate of the bearing which is attached to the side walls of the casing by bolts 57.

The bearing between the eccentric and ring at the inner end of the reciprocating rod or arm is lubricated by a grease cup 58 at the underside of the ring and an oil cup 59 threaded into the upper section of said ring.

In the operation of the amusement car over the track it is driven by the electric-motor geared to the driving axle of the truck, and when the car is in two sections connected together as illustrated in Fig. 2 and each mounted on a truck, one of the trucks only may be provided with a motor, for as the eccentrics are turned from the axles one is directly operated by the motor driven axle while the other is operated by the wheels running over the track. As the car speeds over the track the reciprocating motions of the connecting rods or arms between the truck and body of the car at opposite sides of the center thereof impart the desired rocking of the car body sections and the extent to which said sections are rocked will depend upon the throw of the eccentrics. It will be noted that the spring supporting each section or body at approximately the center thereof permits a rocking movement of each car body on the reciprocating rod.

By providing an amusement car with rocking body sections mounted on trucks and having rocking motions imparted thereto by the mechanism hereinbefore described it will be obvious that my invention not only presents an attractive conveyance for passengers by imitating the crawling or walking of an animal but also will afford the passengers riding in the cars sensations not to be experienced by the usual form of trolley cars.

I claim:—

1. A car for amusement parks comprising a pair of wheeled trucks and car bodies mounted thereon and connected to each other for rocking motion one with respect to the other, rods connected to and depending from the car bodies at opposite sides of the center thereof, a driven shaft on each truck, and means interposed between the driven shafts and aforesaid rods for imparting rocking motions to said car bodies.

2. A car for amusement parks comprising a pair of wheeled trucks and car bodies mounted thereon and connected to each other for rocking motion one with respect to the other, rods connected to and depending from the car bodies at opposite sides of the center thereof, a driven shaft on each truck, and eccentrics on the driven shaft for operating the rods to impart rocking motions to the car bodies.

3. A car for amusement parks comprising a pair of wheeled trucks and car bodies mounted thereon and connected to each other for rocking motion one with respect to the other, a leaf spring supporting each body on its truck, a driven shaft on each truck, and means interposed between said driven shafts and car bodies at one side of the leaf springs for imparting rocking motions to the car bodies.

JOHN KAHL.